United States Patent
Li

(10) Patent No.: US 12,445,252 B2
(45) Date of Patent: Oct. 14, 2025

(54) TRANSMISSION METHOD AND APPARATUS, AND TERMINAL AND NETWORK DEVICE

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 364 days.

(21) Appl. No.: 18/044,351

(22) PCT Filed: Sep. 15, 2020

(86) PCT No.: PCT/CN2020/115344
§ 371 (c)(1),
(2) Date: Mar. 7, 2023

(87) PCT Pub. No.: WO2022/056678
PCT Pub. Date: Mar. 24, 2022

(65) Prior Publication Data
US 2023/0336311 A1    Oct. 19, 2023

(51) Int. Cl.
*H04L 5/00* (2006.01)
(52) U.S. Cl.
CPC .................. *H04L 5/0053* (2013.01)
(58) Field of Classification Search
CPC ..................................... H04L 5/0053
See application file for complete search history.

(56) References Cited

U.S. PATENT DOCUMENTS

2019/0124631 A1    4/2019 Ren et al.
2020/0413412 A1*  12/2020 Kim ..................... H04W 24/08

FOREIGN PATENT DOCUMENTS

CN          111404654     *  7/2020 ............... H04L 5/00
WO    WO 2018127145 A1    7/2018

OTHER PUBLICATIONS

International Search Report and Written Opinion of International Application No. PCT/CN2020/115344, dated Jun. 17, 2021, 14 pages.
Extended European Search Report issued in Application No. 20953539.2 dated May 10, 2024, 10 pages.

* cited by examiner

*Primary Examiner* — Ronald B Abelson
(74) *Attorney, Agent, or Firm* — Finnegan, Henderson, Farabow, Garrett & Dunner, L.L.P.

(57) ABSTRACT

A transmission method is performed by a terminal, and includes: obtaining a number of Physical Downlink Control Channel (PDCCH) transmission occasions; determining, based on the number of PDCCH transmission occasions and a number of transmission resources, a Downlink Control Information (DCI) signaling receiving mode; and receiving a DCI signaling based on the DCI signaling receiving mode.

20 Claims, 4 Drawing Sheets

TRANSMISSION METHOD AND APPARATUS, AND TERMINAL AND NETWORK DEVICE

CROSS-REFERENCE TO RELATED APPLICATION

This application is a U.S. national phase of International Application No. PCT/CN2020/115344, filed on Sep. 15, 2020, the content of which is incorporated herein by reference in its entirety.

TECHNICAL FIELD

The disclosure relates to a field of communication technology, in particular to a transmission method, a transmission apparatus, a terminal, and a network device.

BACKGROUND

In a 5G New Radio (NR) system, especially when a communication frequency band is in a frequency range 2, since a high frequency channel fades fast, in order to ensure the coverage, it is necessary to use beams for signal transmission and reception.

When a network device has multiple Transmission Reception Points (TRPs), the network device can use multiple TRPs to provide services to a terminal. For example, in order to improve the transmission reliability and transmission efficiency of the Physical Downlink Control Channel (PDCCH), the same Downlink Control Information (DCI) signaling can be sent to the terminal by multiple TRPs.

SUMMARY

Embodiments of the disclosure provide a transmission method, a transmission apparatus, a terminal, and a network device. The technical solution is provided as follows.

According to an aspect of embodiments of the disclosure, a transmission method is provided. The method includes:
  obtaining a number of PDCCH transmission occasions;
  determining, based on the number of PDCCH transmission occasions and a number of transmission resources, a DCI signaling receiving mode; and
  receiving a DCI signaling based on the DCI signaling receiving mode.

According to an aspect of embodiments of the disclosure, a transmitting method is provided. The method includes:
  determining a number of PDCCH transmission occasions;
  indicating the number of PDCCH transmission occasions to a terminal, in which the terminal is configured to determine a DCI signaling receiving mode based on the number of PDCCH transmission occasions and a number of transmission resources; and
  sending a DCI signaling to the terminal.

According to an aspect of embodiments of the disclosure, a transmission apparatus is provided. The apparatus includes: an obtaining module, a determining module, and a receiving module.

The obtaining module is configured to obtain a number of PDCCH transmission occasions.

The determining module is configured to determine, based on the number of PDCCH transmission occasions and a number of transmission resources, a DCI signaling receiving mode.

The receiving module is configured to receive a DCI signaling based on the DCI signaling receiving mode.

According to an aspect of embodiments of the disclosure, a transmitting apparatus is provided. The apparatus includes: a determining module, an indicating module, and a sending module.

The determining module is configured to determine a number of PDCCH transmission occasions.

The indicating module is configured to indicate the number of PDCCH transmission occasions to a terminal, in which the terminal is configured to determine a DCI signaling receiving mode based on the number of PDCCH transmission occasions and a number of transmission resources.

The sending module is configured to send a DCI signaling to the terminal.

According to an aspect of embodiments of the disclosure, a terminal is provided. The terminal includes: a processor, and a memory for storing instructions executable by the processor. The processor is configured to load and execute the executable instructions to implement the above transmission method.

According to an aspect of embodiments of the disclosure, a network device is provided. The network device includes: a processor, and a memory for storing instructions executable by the processor. The processor is configured to load and execute the executable instructions to implement the above transmission method.

According to an aspect of the disclosure, a computer readable storage medium is provided. When instructions stored in the computer readable storage medium are executed by a processor, the above transmission method is implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms "first", "second", and "third" may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

It should be understood that although the steps described in the embodiments of the disclosure are numbered for ease of understanding, these numbers do not represent the order in which the steps are performed, nor does it mean that the sequentially numbered steps must be performed together. It should be understood that one or more steps of the sequentially numbered steps may be performed separately to solve the corresponding technical problems and achieve the desired technical solutions. Although multiple steps are exemplarily listed together in the accompanying drawings, it does not mean that these steps must be performed together. These steps are listed exemplarily in the accompanying drawings for ease of understanding.

Figure 1:
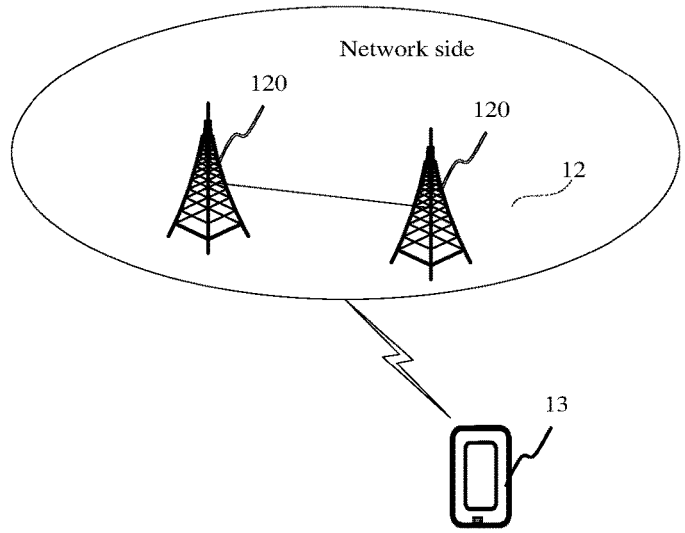
FIG. 1 is a schematic diagram of a communication system according to an exemplary embodiment of the disclosure.

FIG. 1 is a schematic diagram of a communication system according to an exemplary embodiment of the disclosure. As shown in FIG. 1, the communication system may include: a network side 12 and a terminal 13.

The network side 12 includes a plurality of network devices 120. The network device 120 may be a base station. The base station is a device deployed in an access network to provide a wireless communication function for the terminal. The base station can be either a base station of a serving cell of the terminal 13 or a base station of an adjacent cell of the serving cell of the terminal 13. The base station may include various forms of macro base stations, micro base stations, relay stations, access points, and TRPs. In a system using different wireless access technologies, the name of the device having the functions of the base station may be different, for example, it is called gNodeB or gNB in the 5G NR system. The description of "base station" may change as the communication technology evolves. The network device 120 may also be a Location Management Function (LMF) entity. During communication in internet of vehicles, the network device 120 can also be an in-vehicle terminal device.

The terminal 13 may include a variety of handheld devices, in-vehicle devices, wearable devices, computing devices with wireless communication capabilities, or other processing devices connected to a wireless modem, and various forms of user devices, such as Mobile Station (MS), terminals, Internet of Things (IoT) devices, and Industry Internet of Things (IIoT) devices. For ease of description, the devices mentioned above are collectively referred to as the terminal. The network device 120 and the terminal 13 communicate with each other via a certain radio interface technology, such as a Uu interface.

When multiple TRPs are used to send the same DCI signaling to the terminal, there are two ways.

In the first way, the complete content of the same DCI signaling is sent on each PDCCH transmission resource provided by each TRP, i.e., multiple TRPs send the same DCI signaling repeatedly multiple times. In this case, if the terminal can correctly decode the DCI signaling based on the DCI signaling received on one of the transmission resources, the terminal does not have to receive the DCI signaling on other transmission resources. Otherwise, the terminal can also perform soft combination on the DCI signaling transmitted through several transmissions, to further improve the decoding success rate and enhance the reliability of PDCCH transmission.

In the second way, only part of the complete content of one DCI signaling is sent on each PDCCH transmission resource provided by each TRP, and the terminal can obtain the complete content of the DCI signaling by receiving parts of the complete content of the DCI signaling on multiple TRPs for stitching and decoding, to improve the reliability of PDCCH transmission (the lower the transmission bit rate, the higher the reliability). However, if only part of the complete content of the DCI signaling on one of the multiple TRPs is received, the DCI signaling cannot be successfully decoded.

However, in order to achieve the above transmission effect, the terminal needs to know which transmitting mode is currently used, otherwise, if the terminal adopts the wrong mode to receive, the DCI signaling may not be received correctly, and the communication quality may be decreased.

The communication system and the application scenario described in this embodiment is to illustrate the technical solution of this embodiment more clearly, which do not constitute a limitation of the technical solution provided by this embodiment. It is known to those skilled in the art that the technical solution provided by this embodiment is equally applicable to similar technical problems as the communication system evolves and new application scenarios emerge.

Figure 2:
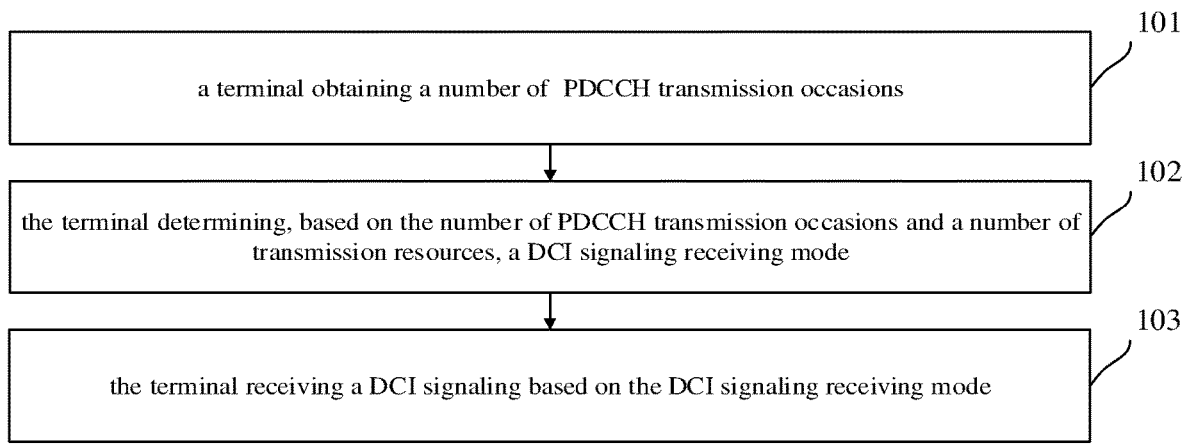
FIG. 2 is a flowchart of a transmission method according to an exemplary embodiment of the disclosure.

FIG. 2 is a flowchart of a transmission method according to an exemplary embodiment of the disclosure. As shown in FIG. 2, the method includes the following.

At block 101, a terminal obtains a number of PDCCH transmission occasions.

The number of PDCCH transmission occasions is the number of times multiple TRPs transmit the same DCI signaling. The transmission reliability can be improved by repeated transmission.

At block 102, the terminal determines a DCI signaling receiving mode based on the number of PDCCH transmission occasions and a number of transmission resources.

As mentioned above, when the multiple TRPs transmit the same DCI signaling, each PDCCH transmission resource can either transmit the complete content of the DCI signaling (i.e., each TRP transmits the DCI signaling once), or transmit only part of the complete content of the DCI signaling (i.e., multiple TRPs transmit the DCI signaling once together), which may cause different relations between the number of PDCCH transmission occasions and the number of transmission resources. From the relation, the way of sending the same DCI signaling by multiple TRPs can be deduced, and the corresponding receiving mode can be determined, thereby realizing the correct reception of the DCI signaling.

At block 103, the terminal receives a DCI signaling based on the DCI signaling receiving mode.

In the embodiment, when the terminal receives the DCI signaling, the number of PDCCH transmission occasions is determined, and the DCI signaling receiving mode can be determined based on the number of PDCCH transmission occasions and the number of transmission resources. For example, when the number of PDCCH transmission occasions is equal to the number of transmission resources, it means that the complete content of the same DCI signaling is transmitted on each PDCCH transmission resource, and in this case, the reception of the DCI signaling is performed in a mode of transmitting complete content of one DCI signaling on each transmission resource, i.e., the mode of transmitting the same DCI signaling several times on multiple transmission resources is adopted. In this case, if the terminal can correctly decode the DCI signaling based on the DCI signaling received on one of the transmission resources, the terminal does not have to receive the DCI signaling on other transmission resources. Otherwise, the terminal can also perform soft combination on the DCI signaling transmitted through several transmissions, to further improve the decoding success rate. For another example, if the number of PDCCH transmission occasions is less than the number of transmission resources, it means that a part of the complete content of the same DCI signaling is transmitted on each PDCCH transmission resource, and the reception of the DCI signaling is performed in a mode of transmitting the complete content of the same DCI signaling on multiple transmission resources (i.e., each transmission resource transmits a part of the content of the same DCI signaling), i.e., the DCI signaling is received by combining the contents transmitted on the multiple transmission resources into one complete DCI signaling. The DCI signaling receiving mode is determined in the above way, it is ensured that the terminal can receive and decode the DCI signaling correctly, thereby improving the communication quality.

The PDCCH transmission occasion refers to the complete transmission of a DCI signaling. For example, each of the PDCCH transmission occasions corresponds to one PDCCH transmission resource, and each PDCCH transmission resource is used to transmit complete content of a first DCI signaling. For another example, each PDCCH transmission occasion corresponds to multiple PDCCH transmission resources, and each PDCCH transmission resource is used to transmit a part of content of a second DCI signaling, and the parts of content of the second DCI signaling transmitted on multiple PDCCH transmission resources corresponding to one PDCCH transmission occasion are combined to obtain the complete content of the second DCI signaling.

Optionally, obtaining the number of PDCCH transmission occasions includes:
  obtaining the number of PDCCH transmission occasions stored in a local memory and configured by protocol; or
  obtaining an indication signaling, and determining the number of PDCCH transmission occasions based on the indication signaling.

The embodiments of the disclosure provide two methods for obtaining the number of PDCCH transmission occasions. The first method is to obtain the number locally in which the transmission number is written in the local memory and the protocol configuration in advance. The second method is to obtain the number from a network device in real time, e.g., by the indication signaling.

For example, the indication signaling is at least one of a RRC signaling, a MAC signaling, or a DCI signaling.

When obtaining the number of PDCCH transmission occasions based on the indication signaling, the network device can either indicate in the indication signaling the number of PDCCH transmission occasions directly or indirectly using other parameters, for example by indicating the number of TCI states for PDCCH transmission, the number of DMRSs for PDCCH demodulation, the PDCCH transmission method. Some of these parameters are directly equal to the number of PDCCH transmission occasions, and some can be used to determine the number of PDCCH transmission occasions.

Optionally, determining the number of PDCCH transmission occasions based on the indication signaling may include the following.

First, the number of PDCCH transmission occasions is determined from the indication signaling carrying the number of PDCCH transmission occasions.

Second, the number of PDCCH transmission occasions is determined from the indication signaling carrying the number of TCI states, in which the number of PDCCH transmission occasions is equal to the number of TCI states.

The TCI state is used to indicate the beam used for PDCCH transmission.

Third, the number of PDCCH transmission occasions is determined from the indication signaling carrying a PDCCH transmission method and a number of TCI states, in which the number of PDCCH transmission occasions is equal to 1 or equal to the number of TCI states.

The PDCCH transmission method includes Frequency-Division Multiplexing (FDM), Space-Division Multiplexing (SDM), intra-slot Time-Division Multiplexing (intra-slot TDM), and inter-slot TDM. These four methods include the mode of transmitting the complete content of the same DCI signaling on each transmission resource block and the mode of transmitting a part of content of the same DCI signaling on each transmission resource block. If each transmission resource block transmits the complete content of the DCI signaling, the number of PDCCH transmission occasions is equal to the number of TCI states. If each transmission resource block transmits a part of content of the DCI signaling, the number of PDCCH transmission occasions is equal to 1.

Fourth, the number of PDCCH transmission occasions is determined from the indication signaling carrying the number of DMRSs, in which the number of PDCCH transmission occasions is equal to the number of DMRSs.

Different DMRSs differ in at least one of a DMRS port, a sequence, a time domain resource, a frequency domain resource, or a Code Division Multiplexing (CDM) group.

For example, the number of DMRSs indicated in the indication signaling is M, and M is greater than or equal to 2.

The port of each DMRS in the M DMRSs is different; or,
  the sequence of each DMRS in the M DMRSs is different; or,
  the time domain resource of each DMRS in the M DMRSs is different; or,
  the frequency domain resource of each DMRS in the M DMRSs is different; or
  the CDM group corresponding to each DMRS in the M DMRSs is different.

Optionally, at least N transmission resources of the multiple PDCCH transmission resources correspond to N TCI states respectively, in which N is greater than or equal to 2.

In one case, all the PDCCH transmission resources correspond to the same Control Resource Set (CORESET). This scenario further includes the following.

1. All the PDCCH transmission resources correspond to the same search space. One CORESET corresponds to multiple TRPs, and one CORESET has multiple search spaces.

1.1. All the PDCCH transmission resources correspond to the same PDCCH candidate location in the same search space. One search space has more than one candidate locations that can be used for PDCCH transmission.

1.1.1. Different PDCCH transmission resources correspond to different Control Channel Elements (CCEs) at the same PDCCH candidate location, i.e., each PDCCH transmission resource corresponds to a different frequency domain. Taking Aggregation Level 4 as an example, the PDCCH candidate location includes 4 CCEs, in which two CCEs correspond to TCI #0 and are transmitted by TRP #0, and the other two CCEs correspond to TCI #1 and are transmitted by TRP #1. In this case, different CCEs correspond to different TCI states as mentioned before.

1.1.2. Different PDCCH transmission resources correspond to different Resource Element Group bundles (REG bundles) of the same CCE at the same PDCCH candidate location, i.e., each PDCCH transmission resource corresponds to a different frequency domain. Taking Aggregation Level 1 as an example, the PDCCH candidate location includes 1 CCE, and the CCE includes two REG bundles, in which 1 REG bundle corresponds to TCI #0 and is sent by TRP #0, and the other REG bundle corresponds to TCI #1 and is sent by TRP #1. In this case, different REG bundles correspond to different TCI states.

1.1.3. Different PDCCH transmission resources correspond to all CCEs at the same PDCCH candidate location, i.e., each PDCCH transmission resource corresponds to the same time domain and frequency domain. For example, taking Aggregation Level 4 as an example, the PDCCH candidate location includes 4 CCEs, the 4 CCEs correspond to TCI #0 and TCI #1, and the same DCI signaling is sent by TRP #0 and TRP #1 on these 4 CCEs using different beams. In this case, different TRPs use different TCI states to send the DCI signaling on the same time-frequency resource.

1.2. At least two PDCCH transmission resources among all the PDCCH transmission resources correspond to different PDCCH candidate locations, i.e., each PDCCH transmission resource corresponds to a different frequency domain. In this case, different PDCCH candidate locations correspond to different TCI states and are sent by different TRPs.

2. At least two PDCCH transmission resources among all the PDCCH transmission resources correspond to different search spaces. In this case, different search spaces correspond to different TCI states and are sent by different TRPs.

In another case, at least 2 PDCCH transmission resources among all the PDCCH transmission resources correspond to different CORESETs. In this case, different CORESETs correspond to different TCI states and are sent by different TRPs.

It should be noted that the above parameter carried in the indication signaling is not always equal to the number of PDCCH transmission occasions. Only when a parameter is equal to the number of PDCCH transmission occasions, the network device uses the parameter to indicate the number of PDCCH transmission occasions. When a parameter is not equal to the number of PDCCH transmission occasions, the network device does not use the parameter to indicate the number of PDCCH transmission occasions.

Optionally, determining the DCI signaling receiving mode based on the number of PDCCH transmission occasions and the number of transmission resources includes:

in response to the number of PDCCH transmission occasions being equal to the number of transmission resources, receiving in a mode of transmitting complete content of the same DCI signaling on each transmission resource, i.e., each transmission resource transmits the DCI signaling once; or in response to the number of PDCCH transmission occasions being less than the number of transmission resources, receiving in a mode of transmitting complete content of the same DCI signaling on a plurality of transmission resources (i.e., each transmission resource transmits a part of content of the same DCI signaling), i.e., all the transmission resources together transmit the DCI signaling once.

When the terminal receives in a mode of transmitting the complete content of the same DCI signaling on each transmission resource, the terminal receives multiple copies of the complete content of the DCI signaling. In this case, if the terminal can correctly decode the DCI signaling based on the DCI signaling received on one of the transmission resources, the terminal does not have to receive the DCI signaling on other transmission resources. Otherwise, the terminal can also perform soft combination and decoding on the multiple copies of the complete content of the DCI signaling, thus ensuring the reliability of PDCCH transmission.

When the terminal receives in a mode of transmitting a part of content of the same DCI signaling on each transmission resource, the terminal receives multiple parts of content of the DCI signaling, and by splicing and decoding the multiple parts of content of the DCI signaling, i.e., by combining all the multiple parts of content of the DCI signaling transmitted on multiple transmission resource, the complete content of the DCI signaling is obtained, and the reliability of PDCCH transmission is ensured.

Optionally, the method further includes:

obtaining the number of transmission resources.

The number of transmission resources can be obtained in a similar way as the number of PDCCH transmission occasions, e.g., either locally or through an instruction. When obtaining through the instruction, it is possible to carry in the instruction either the number of transmission resources or other parameters that indirectly indicate the number of transmission resources.

For example, any two PDCCH transmission resources are different in at least one of a time domain, a frequency domain, a space domain or a code domain.

It is noted that the aforementioned blocks 101 to 103 and the above optional blocks can be combined in any way.

Figure 3:
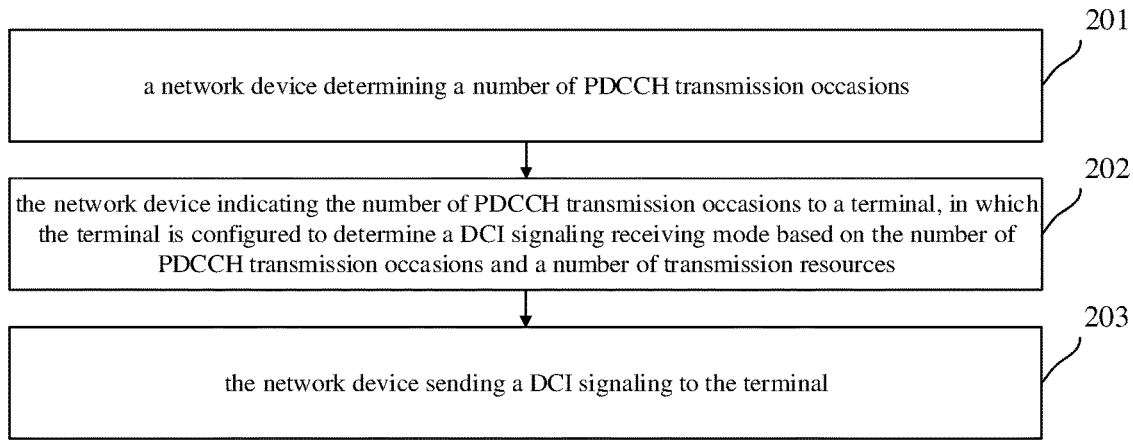
FIG. 3 is a flowchart of a transmission method according to an exemplary embodiment of the disclosure.

FIG. 3 is a flowchart of a transmission method according to an exemplary embodiment of the disclosure. As shown in FIG. 3, the method further includes the following.

At block 201, a network device determines a number of PDCCH transmission occasions.

At block 202, the network device indicates the number of PDCCH transmission occasions to a terminal, and the terminal determines, based on the number of PDCCH transmission occasions and a number of transmission resources, a DCI signaling receiving mode.

When the network device determines the number of PDCCH transmission occasions, it can either send the number of PDCCH transmission occasions directly to the terminal or send other parameters that can indirectly indicate the number of PDCCH transmission occasions to the terminal, as long as the terminal can determine the number of PDCCH transmission occasions based on these parameters.

At block 203, the network device sends the DCI signaling to the terminal.

The transmitting mode used by the network device corresponds to the receiving mode determined by the terminal. For example, when the terminal receives in a mode of transmitting the complete content of one DCI signaling on each transmission resource, the network device also sends in a mode of transmitting the complete content of one DCI signaling each time, i.e., the multiple transmission resources transmit the same DCI signaling for several times. In this case, if the terminal can correctly decode the DCI signaling based on the DCI signaling received on one of the transmission resources, the terminal may not have to receive the DCI signaling on other transmission resources. Otherwise, the terminal can perform the soft combination on the DCI signaling transmitted through several transmissions, to further improve the decoding success rate. When the terminal receives in a mode of transmitting the complete content of the same DCI signaling on multiple transmission resources (i.e., each transmission resource transmits a part of content of the same DCI signaling), the network device also sends in a mode of transmitting a part of content of the same DCI signaling each time, i.e., the parts of content transmitted on the multiple transmission resources are combined into one complete DCI signaling.

In the embodiment, the network device indicates the number of PDCCH transmission occasions to the terminal, so that the terminal can determine the DCI signaling receiving mode by comparing the number of PDCCH transmission occasions with the number of transmission resources. For example, when the number of PDCCH transmission occasions is equal to the number of transmission resources, it means that the complete content of the same DCI signaling is transmitted on each PDCCH transmission resource, then the reception of the DCI signaling is performed in a mode of transmitting complete content of the DCI signaling on each transmission resource, i.e., the same DCI signaling transmitted for several times on the multiple transmission resources. If the terminal can correctly decode the DCI signaling based on the DCI signaling received on one of the transmission resources, the terminal does not have to receive the DCI signaling on other transmission resources. Otherwise, the terminal can also perform soft combination on the DCI signaling transmitted through several transmissions to further improve the decoding success rate. For another example, if the number of PDCCH transmission occasions is less than the number of transmission resources, it means that a part of content of the same DCI signaling is transmitted on each PDCCH transmission resource, then the reception of the DCI signaling is performed in a mode of transmitting complete content of the same DCI signaling on multiple transmission resources (i.e., each transmission resource transmits a part of content of the same DCI signaling), i.e., the contents transmitted on multiple transmission resources are combined into one complete DCI signaling. According to the DCI signaling receiving mode determined in the above way, it is ensured that the terminal can receive and decode the DCI signaling correctly, thereby improving the communication quality.

Optionally, indicating the number of PDCCH transmission occasions to the terminal, includes:
sending an indication signaling, in which the indication signaling is configured to indicate the number of PDCCH transmission occasions.

For example, the indication signaling is at least one of a RRC signaling, a MAC signaling, or a DCI signaling.

Optionally, sending the indication signaling includes:
sending the indication signaling carrying the number of PDCCH transmission occasions; or
sending the indication signaling carrying a number of TCI states, in which the number of PDCCH transmission occasions is equal to the number of TCI states; or
sending the indication signaling carrying a PDCCH transmission method and a number of TCI states, in which the number of PDCCH transmission occasions is equal to 1 or equal to the number of TCI states; or
sending the indication signaling carrying a number of DMRSs, in which the number of PDCCH transmission occasions is equal to the number of DMRSs.

For example, different DMRSs differ in at least one of a DMRS port, a sequence, a time domain resource, a frequency domain resource, or a CDM group.

Optionally, the method further includes:
indicating the number of transmission resources to the terminal.

The indication mode of the number of transmission resources is similar as the indication mode of the number of PDCCH transmission occasions. For example, the number of transmission resources can be carried directly in the instruction, or other parameters can be carried in the instruction to indirectly indicate the number of transmission resources.

For example, any two PDCCH transmission resources are different in at least one of a time domain, a frequency domain, a space domain or a code domain.

It is noted that the aforementioned blocks 201 to 203 and the above optional blocks can be combined in any way.

Figure 4:
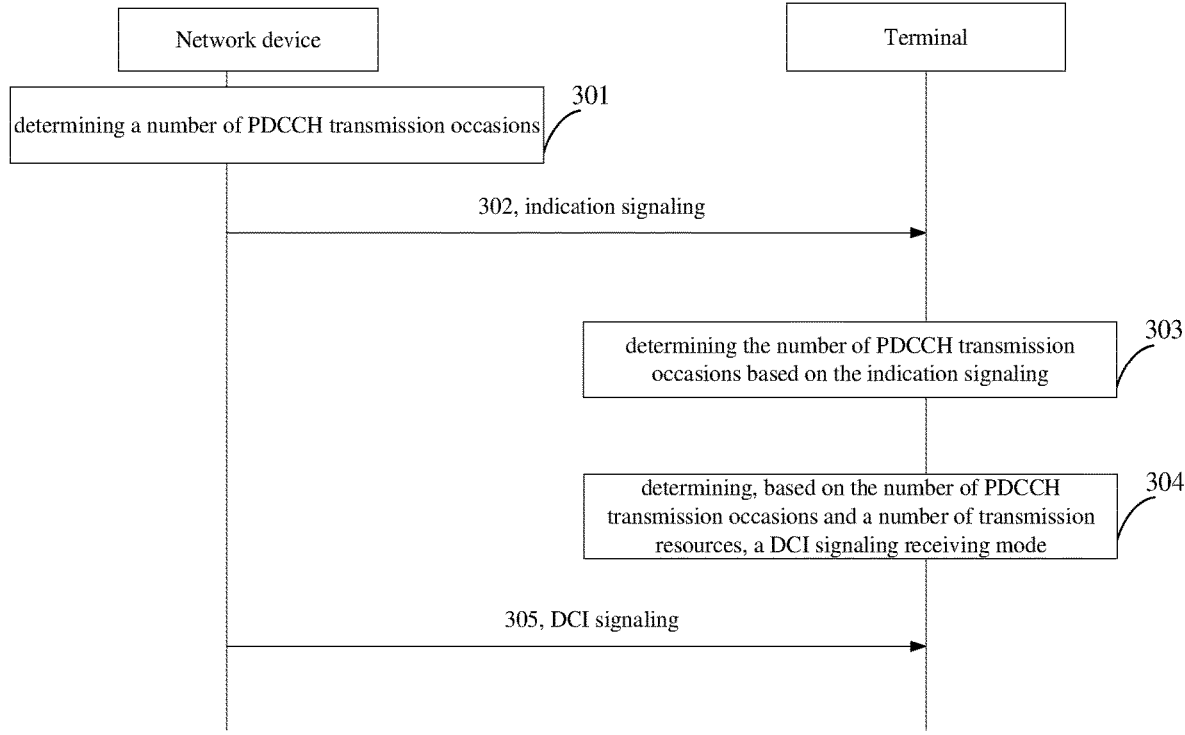
FIG. 4 is a flowchart of a transmission method according to an exemplary embodiment of the disclosure.

FIG. 4 is a flowchart of a transmission method according to an exemplary embodiment of the disclosure. As shown in FIG. 4, the method further includes the following.

At block 301, a network device determines a number of PDCCH transmission occasions.

The network device determines the number of PDCCH transmission occasions based on a transmission protocol according to a network condition, a terminal priority or the like.

When there are multiple PDCCH transmission occasions, multiple TRPs are used for transmitting the same DCI signaling for several times. In this case, the number of PDCCH transmission occasions can be indicated to the terminal to ensure that the terminal can receive correctly.

At block 302, the network device sends an indication signaling, in which the indication signaling is configured to indicate the number of PDCCH transmission occasions. The terminal receives the indication signaling.

For example, the indication signaling is at least one of a RRC signaling, a MAC signaling, or a DCI signaling.

At block 303, the terminal determines the number of PDCCH transmission occasions based on the indication signaling.

The PDCCH transmission occasion refers to the complete transmission of a DCI signaling. For example, each of the PDCCH transmission occasions corresponds to one PDCCH transmission resource, and each PDCCH transmission resource is configured to transmit the complete content of a first DCI signaling. For another example, each PDCCH transmission occasion corresponds to multiple PDCCH transmission resources, and each PDCCH transmission resource is configured to transmit a part of content of a second DCI signaling. The parts of content of the second DCI signaling transmitted on the multiple PDCCH transmission resources corresponding to a single PDCCH transmission occasion are combined to obtain the complete content of the second DCI signaling.

When using the indication signaling to obtain the number of PDCCH transmission occasions, the network device can either indicate the number of PDCCH transmission occasions directly in this indication signaling or use other parameters to indirectly indicate the number of PDCCH transmission occasions, for example by indicating the number of TCI states for PDCCH transmission, the number of DMRSs for PDCCH demodulation, and the PDCCH transmission method. Some of these parameters are directly equal to the number of PDCCH transmission occasions, and some can be further used to determine the number of PDCCH transmission occasions.

Optionally, determining the number of PDCCH transmission occasions based on the indication signaling may include the following.

First, the number of PDCCH transmission occasions is determined from the indication signaling carrying the number of PDCCH transmission occasions.

Second, the number of PDCCH transmission occasions is determined from the indication signaling carrying the number of TCI states, in which the number of PDCCH transmission occasions is equal to the number of TCI states.

The TCI state is used to indicate the beam used for PDCCH transmission.

Third, the number of PDCCH transmission occasions is determined from the indication signaling carrying a PDCCH transmission method and the number of TCI states, in which the number of PDCCH transmission occasions is equal to 1 or equal to the number of TCI states.

The PDCCH transmission method includes FDM, SDM, intra-slot TDM, and inter-slot TDM. These four methods include the mode of transmitting the complete content of the same DCI signaling on each transmission resource block and the mode of transmitting a part of content of a DCI signaling on each transmission resource block. If each transmission resource block transmits the complete content of the same DCI signaling, the number of PDCCH transmission occasions is equal to the number of TCI states. If each transmission resource block transmits a part of content of the DCI signaling, the number of PDCCH transmission occasions is equal to 1.

Fourth, the number of PDCCH transmission occasions is determined from the indication signaling carrying the number of DMRSs, in which the number of PDCCH transmission occasions is equal to the number of DMRSs.

Different DMRSs differ in at least one of a DMRS port, a sequence, a time domain resource, a frequency domain resource, or a CDM group.

For example, the number of DMRSs indicated in the indication signaling is M, and M is greater than or equal to 2.

The port of each DMRS in the M DMRSs is different; or, the sequence of each DMRS in the M DMRSs is different; or,
the time domain resource of each DMRS in the M DMRSs is different; or,
the frequency domain resource of each DMRS in the M DMRSs is different; or
the CDM group corresponding to each DMRS in the M DMRSs is different.

Optionally, at least N transmission resources of the multiple PDCCH transmission resources correspond to N TCI states respectively, in which N is greater than or equal to 2.

In one case, all the PDCCH transmission resources correspond to the same CORESET. This scenario further includes the following cases.

1. All the PDCCH transmission resources correspond to the same search space.
   1.1. All the PDCCH transmission resources correspond to the same PDCCH candidate location in the same search space.
      1.1.1. Different PDCCH transmission resources correspond to different CCEs at the same PDCCH candidate location, i.e., each PDCCH transmission resource corresponds to a different frequency domain. Taking Aggregation Level 4 as an example, the PDCCH candidate location includes 4 CCEs, in which two CCEs correspond to TCI #0 and are transmitted by TRP #0, and the other two CCEs correspond to TCI #1 and are transmitted by TRP #1. In this case, different CCEs correspond to different TCI states as mentioned before.
      1.1.2. Different PDCCH transmission resources correspond to different REG bundles of the same CCE at the same PDCCH candidate location, i.e., each PDCCH transmission resource corresponds to a different frequency domain. Taking Aggregation Level 1 as an example, the PDCCH candidate location includes 1 CCE, and the CCE includes two REG bundles, in which 1 REG bundle corresponds to TCI #0 and is sent by TRP #0, and the other REG bundle corresponds to TCI #1 and is sent by TRP #1. In this case, different REG bundles correspond to different TCI states.
      1.1.3. Different PDCCH transmission resources correspond to all CCEs at the same PDCCH candidate location, i.e., each PDCCH transmission resource corresponds to the same time domain and frequency domain. For example, taking Aggregation Level 4 as an example, the PDCCH candidate location includes 4 CCEs, the 4 CCEs correspond to TCI #0 and TCI #1, and the same DCI signaling is sent by TRP #0 and TRP #1 on these 4 CCEs using different beams. In this case, different TRPs use different TCI states to send the DCI signaling on the same time-frequency resource.
   1.2. At least two PDCCH transmission resources among all the PDCCH transmission resources correspond to different PDCCH candidate locations, i.e., each PDCCH transmission resource corresponds to a different frequency domain. In this case, different PDCCH candidate locations correspond to different TCI states and are sent by different TRPs.
2. At least two PDCCH transmission resources among all the PDCCH transmission resources correspond to different search spaces. In this case, different search spaces correspond to different TCI states and are sent by different TRPs.

In another case, at least 2 PDCCH transmission resources among all the PDCCH transmission resources correspond to different CORESETs. In this case, different CORESETs correspond to different TCI states and are sent by different TRPs.

It should be noted that the above parameter carried in the indication signaling is not always equal to the number of PDCCH transmission occasions. Only when a parameter is equal to the number of PDCCH transmission occasions, the network device uses the parameter to indicate the number of PDCCH transmission occasions. When a parameter is not equal to the number of PDCCH transmission occasions, the network device does not use the parameter to indicate the number of PDCCH transmission occasions.

At block 304, the terminal determines the DCI signaling receiving mode based on the number of PDCCH transmission occasions and the number of transmission resources.

Optionally, determining the DCI signaling receiving mode based on the number of PDCCH transmission occasions and the number of transmission resources, includes:

in response to the number of PDCCH transmission occasions being equal to the number of transmission resources, receiving in a mode of transmitting complete content of the same DCI signaling on each transmission resource, i.e., each transmission resource transmits the DCI signaling once. In this case, if the terminal can correctly decode the DCI signaling based on the DCI signaling received on one of the transmission resources, the terminal does not have to receive the DCI signaling on other transmission resources, otherwise, the terminal can also perform soft combination on the DCI signaling transmitted through several transmissions to further improve the decoding success rate; or in response to the number of PDCCH transmission occasions being less than the number of transmission resources, receiving in a mode of transmitting complete content of the same DCI signaling on a plurality of transmission resources (i.e., each transmission resource transmits a part of content of the same DCI signaling), i.e., all the transmission resources together transmit the DCI signaling once.

Optionally, the method further includes:

obtaining the number of transmission resources.

The number of transmission resources can be obtained in a similar way as the number of PDCCH transmission occasions, e.g., either locally or through an instruction. When obtaining through the instruction, it is possible to carry in the instruction either the number of transmission resources or other parameters that indirectly indicate the number of transmission resources.

For example, any two PDCCH transmission resources are different in at least one of a time domain, a frequency domain, a space domain or a code domain.

At block 305, the network device sends a DCI signaling to the terminal. The terminal receives the DCI signaling based on the DCI signaling receiving mode.

The transmitting mode used by the network device corresponds to the receiving mode determined by the terminal. For example, when the terminal receives in a mode of transmitting the complete content of the same DCI signaling on each transmission resource separately, the network device also transmits in a mode of transmitting the complete content of the same DCI signaling on each transmission resource. When the terminal receives in a mode of transmitting the complete content of the same DCI signaling transmitted on multiple transmission resources (i.e., each transmission resource transmits a part of content of the same DCI signaling), the network device also transmits in a mode of transmitting a part of content of the same DCI signaling on each transmission resource, i.e., the contents transmitted by the multiple transmission resources are combined into one complete DCI signaling.

Figure 5:
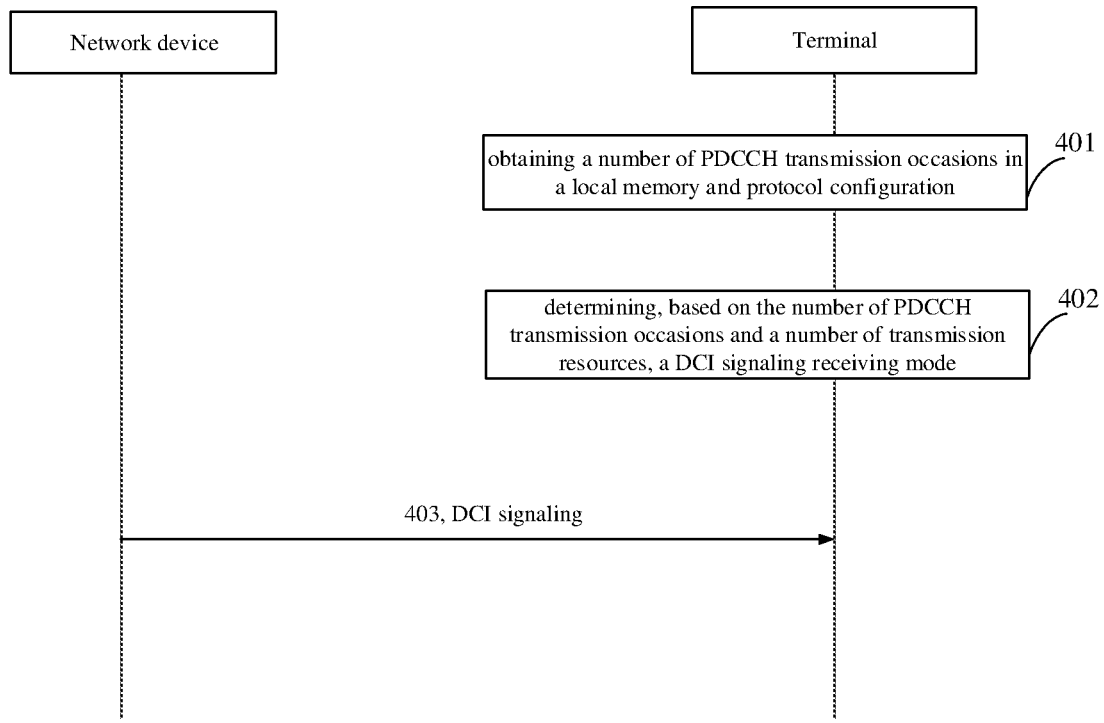
FIG. 5 is a flowchart of a transmission method according to an exemplary embodiment of the disclosure.

FIG. 5 is a flowchart of a transmission method according to an exemplary embodiment of the disclosure. As shown in FIG. 5, the method includes the following.

At block 401, the terminal obtains a number of PDCCH transmission occasions stored in a local memory and configured by protocol.

Compared to the implementation of transmitting the number of PDCCH transmission occasions through a signaling in FIG. 4, the number of PDCCH transmission occasions can be a default value configured by protocol or stored in the local memory in FIG. 5, so that it is unnecessary to obtain the number of PDCCH transmission occasions from the network device each time. Certainly, this default value configured by protocol or stored in the local memory can also be updated.

In addition, in FIG. 5, although the number of PDCCH transmission occasions does not have to be indicated in an indication signaling, in this solution, the network device can still send the indication signaling to the terminal, which can be used to indicate whether the terminal starts repeated transmission of the DCI signaling, i.e., whether to send the same DCI signaling repeatedly by multiple TRPs.

At block 402, the terminal determines a DCI signaling receiving mode based on the number of PDCCH transmission occasions and a number of transmission resources.

The implementation of the terminal determining the DCI signaling receiving mode at block 402 is similar to block 304, which is not described here.

At block 403, the network device sends a DCI signaling to the terminal. The terminal receives the DCI signaling based on the DCI signaling receiving mode.

The DCI signaling transmitting mode at block 403 is similar to block 305, which is not described here.

Figure 6:
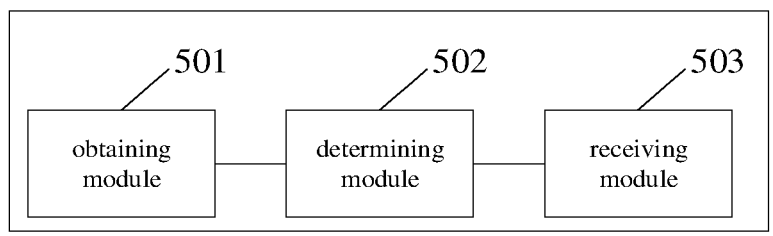
FIG. 6 is a block diagram of a transmission apparatus according to an exemplary embodiment of the disclosure.

FIG. 6 is a block diagram of a transmission apparatus according to an exemplary embodiment of the disclosure. The apparatus has functions which can implement the terminal in the above method embodiment, and the functions can be implemented by hardware or by hardware executing the corresponding software. As shown in FIG. 6, the apparatus includes: an obtaining module 501, a determining module 502, and a receiving module 503.

The obtaining module 501 is configured to obtain a number of PDCCH transmission occasions.

The determining module 502 is configured to determine, based on the number of PDCCH transmission occasions and a number of transmission resources, a DCI signaling receiving mode.

The receiving module 503 is configured to receive a DCI signaling based on the DCI signaling receiving mode.

Optionally, the obtaining module 501 is configured to obtain the number of PDCCH transmission occasions stored in a local memory and configured by protocol; or obtain an indication signaling, and determine the number of PDCCH transmission occasions based on the indication signaling.

For example, the indication signaling is at least one of a RRC signaling, a MAC signaling, or a DCI signaling.

Optionally, the obtaining module 501 is configured to determine the number of PDCCH transmission occasions from the indication signaling carrying the number of PDCCH transmission occasions; or determine the number of PDCCH transmission occasions from the indication signaling carrying a number of TCI states, in which the number of PDCCH transmission occasions is equal to the number of TCI states; or determine the number of PDCCH transmission occasions from the indication signaling carrying a PDCCH transmission method and a number of TCI states, in which the number of PDCCH transmission occasions is equal to 1 or equal to the number of TCI states; or determine the number of PDCCH transmission occasions from the indication signaling carrying a number of DMRSs, in which the number of PDCCH transmission occasions is equal to the number of DMRSs.

Optionally, different DMRSs differ in at least one of a DMRS port, a sequence, a time domain resource, a frequency domain resource, or a CDM group.

Optionally, the determining module 502 is configured to in response to the number of PDCCH transmission occasions being equal to the number of transmission resources, receive in a mode of transmitting complete content of the same DCI signaling on each transmission resource, in which case, if the terminal can correctly decode the DCI signaling based on the DCI signaling received on one of the transmission resources, the terminal does not have to receive the DCI signaling on other transmission resources, otherwise, the terminal can also perform soft combination on the DCI signaling transmitted through several transmissions to further improve the decoding success rate; or in response to the number of PDCCH transmission occasions being less than the number of transmission resources, receive in a mode of transmitting complete content of the same DCI signaling on a plurality of transmission resources (i.e., each transmission resource transmits a part of content of the same DCI signaling), i.e., all the transmission resources together transmit the DCI signaling together once.

Optionally, the obtaining module 501 is further configured to obtain the number of transmission resources.

For example, any two PDCCH transmission resources are different in at least one of a time domain, a frequency domain, a space domain or a code domain.

Figure 7:
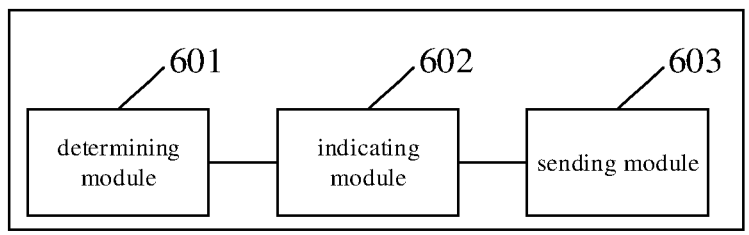
FIG. 7 is a block diagram of a transmitting apparatus according to an exemplary embodiment of the disclosure.

FIG. 7 is a block diagram of a transmitting apparatus according to an exemplary embodiment of the disclosure. The apparatus has functions which can implement the network device in the above method embodiment, and the functions can be implemented by hardware or by hardware executing the corresponding software. As shown in FIG. 7, the apparatus includes: a determining module 601, an indicating module 602, and a sending module 603.

The determining module 601 is configured to determine a number of PDCCH transmission occasions.

The indicating module 602 is configured to indicate the number of PDCCH transmission occasions to a terminal, in which the terminal is configured to determine a DCI signaling receiving mode based on the number of PDCCH transmission occasions and a number of transmission resources.

The sending module 603 is configured to send a DCI signaling to the terminal.

Optionally, the indicating module 602 is configured to send an indication signaling, in which the indication signaling is configured to indicate the number of PDCCH transmission occasions.

For example, the indication signaling is at least one of a RRC signaling, a MAC signaling, or a DCI signaling.

Optionally, the indicating module 602 is configured to send the indication signaling carrying the number of PDCCH transmission occasions; or send the indication signaling carrying a number of TCI states, in which the number of PDCCH transmission occasions is equal to the number of TCI states; or send the indication signaling carrying a PDCCH transmission method and a number of TCI states, in which the number of PDCCH transmission occasions is equal to 1 or equal to the number of TCI states; or send the indication signaling carrying a number of DMRSs, in which the number of PDCCH transmission occasions is equal to the number of DMRSs.

For example, different DMRSs differ in at least one of a DMRS port, a sequence, a time domain resource, a frequency domain resource, or a CDM group.

Optionally, the indicating module 602 is configured to indicate the number of transmission resources to the terminal.

For example, any two PDCCH transmission resources are different in at least one of a time domain, a frequency domain, a space domain or a code domain.

Figure 8:
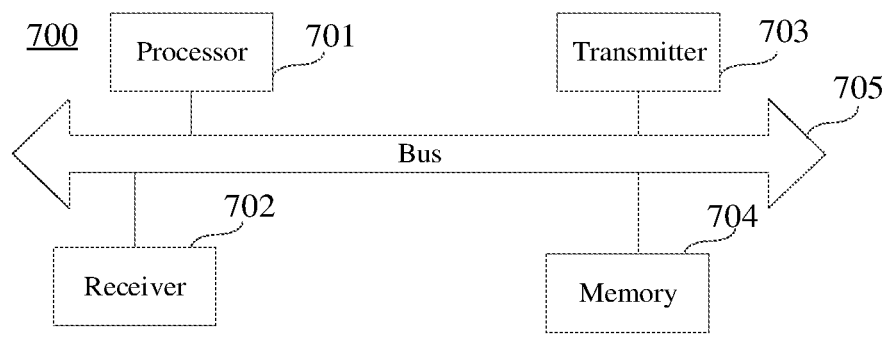
FIG. 8 is a block diagram of a terminal according to an exemplary embodiment of the disclosure.

FIG. 8 is a block diagram of a terminal 700 according to an exemplary embodiment of the disclosure. The terminal 700 may include: a processor 701, a receiver 702, a transmitter 703, a memory 704, and a bus 705.

The processor 701 includes one or more processing cores, and the processor 701 performs various functional applications and information processing by running software programs and modules.

The receiver 702 and the transmitter 703 may be implemented as a communication component, which may be a communication chip.

The memory 704 is connected to the processor 701 via the bus 705.

The memory 704 is configured to store at least one instruction, and the processor 701 is configured to execute the at least one instruction to implement steps in the method embodiments described above.

In addition, the memory 704 can be implemented by any type of volatile or non-volatile storage device or a combination thereof. The volatile or non-volatile storage devices include, but are not limited to: disk or optical disks, Electrically Erasable Programmable Read-Only Memories (EEPROMs), Erasable Programmable Read-Only Memories (EPROMs), Static Random Access Memories (SRAMs), Read-Only Memories (ROMs), magnetic memories, flash memories, Programmable Read-Only Memories (PROMs).

In the exemplary embodiments, a computer-readable storage medium is provided. The computer-readable storage medium stores at least one instruction, at least one program segment, a code set or an instruction set. The at least one instruction, the at least one program, the code set or the instruction set are loaded and executed by the processor, to implement the transmission method provided by each of the method embodiments described above.

Figure 9:
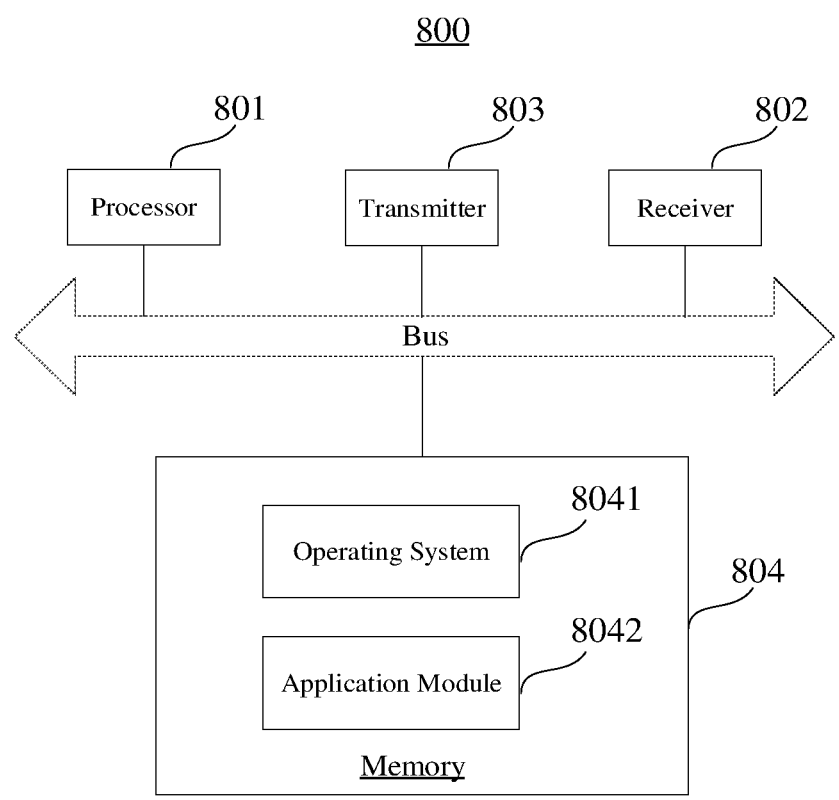
FIG. 9 is a block diagram of a network device according to an exemplary embodiment of the disclosure.

FIG. 9 is a block diagram of a network device 800 according to an exemplary embodiment of the disclosure. The network device 800 may include: a processor 801, a receiver 802, a transmitter 803, and a memory 804. The receiver 802, the transmitter 803, and the memory 804 are each connected to the processor 801 via a bus.

The processor 801 includes one or more processing cores, and the processor 801 executes the method performed by the network device in the transmission method provided by the embodiments of the disclosure by running software programs and modules. The memory 804 is configured to store the software programs and the modules. In detail, the memory 804 may store an operating system 8041, and an application program module 8042 required for at least one function. The receiver 802 is configured to receive communication data sent by other devices, and the transmitter 803 is configured to send communication data to other devices.

In the exemplary embodiments, a computer-readable storage medium is provided. The computer-readable storage medium stores at least one instruction, at least one program segment, a code set or an instruction set. The at least one instruction, the at least one program, the code set or the instruction set are loaded and executed by the processor to implement the transmission method provided by each of the method embodiments described above.

An exemplary embodiment of the disclosure also provides a transmission system, which includes a terminal and a network device. The terminal is a terminal as provided in the embodiment shown in FIG. 8. The network device is a network device as provided in the embodiment shown in FIG. 9.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A transmission method performed by a terminal, the method comprising:
   obtaining a number of Physical Downlink Control Channel (PDCCH) transmission occasions;
   determining, based on the number of PDCCH transmission occasions and a number of transmission resources, a Downlink Control Information (DCI) signaling receiving mode; and
   receiving a DCI signaling based on the DCI signaling receiving mode,
   wherein determining, based on the number of PDCCH transmission occasions and the number of transmission resources, the DCI signaling receiving mode, comprises:
   in response to the number of PDCCH transmission occasions being equal to the number of transmission resources, determining the DCI signaling receiving mode as a mode of transmitting complete content of the DCI signaling on each transmission resource.

2. The method of claim 1, wherein obtaining the number of PDCCH transmission occasions comprises one of:
   obtaining the number of PDCCH transmission occasions stored in a local memory and configured by protocol; or
   obtaining an indication signaling, and determining the number of PDCCH transmission occasions based on the indication signaling.

3. The method of claim 2, wherein the indication signaling is at least one of a Radio Resource Control (RRC) signaling, a Medium Access Control (MAC) signaling or a DCI signaling.

4. The method of claim 2, wherein determining the number of PDCCH transmission occasions based on the indication signaling comprises one of:
   determining the number of PDCCH transmission occasions from the indication signaling carrying the number of PDCCH transmission occasions;
   determining the number of PDCCH transmission occasions from the indication signaling carrying a number of Transmission Configuration Indication (TCI) states, wherein the number of PDCCH transmission occasions is equal to the number of TCI states;
   determining the number of PDCCH transmission occasions from the indication signaling carrying a PDCCH transmission method and a number of TCI states, wherein the number of PDCCH transmission occasions is equal to 1 or equal to the number of TCI states; or
   determining the number of PDCCH transmission occasions from the indication signaling carrying a number of Demodulation Reference Signals (DMRSs), wherein the number of PDCCH transmission occasions is equal to the number of DMRSs.

5. The method of claim 1, wherein determining, based on the number of PDCCH transmission occasions and the number of transmission resources, the DCI signaling receiving mode, further comprises:
   in response to the number of PDCCH transmission occasions being less than the number of transmission resources, determining the DCI signaling receiving mode as a mode of transmitting complete content of the DCI signaling on a plurality of transmission resources.

6. The method of claim 1, further comprising:
   obtaining the number of transmission resources.

7. The method of claim 1, wherein any two PDCCH transmission resources are different in at least one of a time domain, a frequency domain, a space domain or a code domain.

8. A transmitting method performed by a network device, the method comprising:
   determining a number of Physical Downlink Control Channel (PDCCH) transmission occasions;
   indicating the number of PDCCH transmission occasions to a terminal, wherein the terminal is configured to determine a Downlink Control Information (DCI) signaling receiving mode based on the number of PDCCH transmission occasions and a number of transmission resources; and
   sending a DCI signaling to the terminal;
   wherein the terminal is configured to determine the DCI signaling receiving mode as a mode of transmitting complete content of the DCI signaling on each transmission resource in response to the number of PDCCH transmission occasions being equal to the number of transmission resources.

9. The method of claim 8, wherein indicating the number of PDCCH transmission occasions to the terminal, comprises:
   sending an indication signaling, wherein the indication signaling is configured to indicate the number of PDCCH transmission occasions.

10. The method of claim 9, wherein the indication signaling is at least one of a Radio Resource Control (RRC) signaling, a Medium Access Control (MAC) signaling or a DCI signaling.

11. The method of claim 9, wherein sending the indication signaling comprises one of:
   sending the indication signaling carrying the number of PDCCH transmission occasions;
   sending the indication signaling carrying a number of Transmission Configuration Indication (TCI) states, wherein the number of PDCCH transmission occasions is equal to the number of TCI states;
   sending the indication signaling carrying a PDCCH transmission method and a number of TCI states, wherein the number of PDCCH transmission occasions is equal to 1 or equal to the number of TCI states; or sending the indication signaling carrying a number of Demodulation Reference Signals (DMRSs), wherein the number of PDCCH transmission occasions is equal to the number of DMRSs.

12. The method of claim 8, further comprising:
indicating the number of transmission resources to the terminal.

13. The method of claim 8, wherein any two PDCCH transmission resources are different in at least one of a time domain, a frequency domain, a space domain or a code domain.

14. A network device, comprising:
a processor; and
a memory for storing instructions executable by the processor;
wherein the processor is configured to perform the method of claim 8.

15. A terminal, comprising:
a processor; and
a memory for storing instructions executable by the processor;
wherein the processor is configured to:
obtain a number of Physical Downlink Control Channel (PDCCH) transmission occasions;
determine, based on the number of PDCCH transmission occasions and a number of transmission resources, a Downlink Control Information (DCI) signaling receiving mode; and
receive a DCI signaling based on the DCI signaling receiving mode;
wherein in determining, based on the number of PDCCH transmission occasions and the number of transmission resources, the DCI signaling receiving mode, the processor is further configured to:
in response to the number of PDCCH transmission occasions being equal to the number of transmission resources, determine the DCI signaling receiving mode as a mode of transmitting complete content of the DCI signaling on each transmission resource.

16. The terminal of claim 15, wherein the processor is further configured to perform one of:
obtaining the number of PDCCH transmission occasions stored in a local memory and configured by protocol; or
obtaining an indication signaling, and determining the number of PDCCH transmission occasions based on the indication signaling.

17. The terminal of claim 16, wherein the indication signaling is at least one of a Radio Resource Control (RRC) signaling, a Medium Access Control (MAC) signaling or a DCI signaling.

18. The terminal of claim 16, wherein the processor is further configured to perform one of:
determining the number of PDCCH transmission occasions from the indication signaling carrying the number of PDCCH transmission occasions;
determining the number of PDCCH transmission occasions from the indication signaling carrying a number of Transmission Configuration Indication (TCI) states, wherein the number of PDCCH transmission occasions is equal to the number of TCI states;
determining the number of PDCCH transmission occasions from the indication signaling carrying a PDCCH transmission method and a number of TCI states, wherein the number of PDCCH transmission occasions is equal to 1 or equal to the number of TCI states; or
determining the number of PDCCH transmission occasions from the indication signaling carrying a number of Demodulation Reference Signals (DMRSs), wherein the number of PDCCH transmission occasions is equal to the number of DMRSs.

19. The terminal of claim 15, wherein the processor is further configured to:
in response to the number of PDCCH transmission occasions being less than the number of transmission resources, determine the DCI signaling receiving mode as a mode of transmitting complete content of the DCI signaling on a plurality of transmission resources.

20. The terminal of claim 15, wherein the processor is further configured to:
obtain the number of transmission resources.

* * * * *